US011287886B1

United States Patent
Harb et al.

(10) Patent No.: US 11,287,886 B1
(45) Date of Patent: Mar. 29, 2022

(54) SYSTEMS FOR CALIBRATING FINGER DEVICES

(71) Applicant: Apple Inc., Cupertino, CA (US)

(72) Inventors: Adrian Z. Harb, San Jose, CA (US); Benjamin R. Blachnitzky, San Francisco, CA (US); Ahmet Fatih Cihan, San Jose, CA (US); Stephen E. Dey, San Francisco, CA (US); Mengshu Huang, Cupertino, CA (US); Mark T. Winkler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/021,989

(22) Filed: Sep. 15, 2020

(51) Int. Cl.
| | |
|---|---|
| *G06F 3/01* | (2006.01) |
| *H02J 7/02* | (2016.01) |
| *G06F 1/16* | (2006.01) |
| *G02B 27/01* | (2006.01) |
| *H02J 7/00* | (2006.01) |

(Continued)

(52) U.S. Cl.
CPC ............ *G06F 3/014* (2013.01); *G06F 3/0304* (2013.01); *G06F 3/0346* (2013.01); *G06T 7/20* (2013.01); *H04R 1/1016* (2013.01); *G06F 3/02* (2013.01); *G06F 3/044* (2013.01);
(Continued)

(58) Field of Classification Search
CPC ...... G06F 3/014; G06F 3/0304; G06F 3/0346; G06F 3/02; G06F 3/044; G06F 2203/0331; G06F 2203/04105; G06T 7/20; G06T 2207/30196; H04R 1/1016
See application file for complete search history.

(56) References Cited

U.S. PATENT DOCUMENTS

| | | | |
|---|---|---|---|
| 5,581,484 A | 12/1996 | Prince | |
| 5,631,861 A | 5/1997 | Kramer | |

(Continued)

FOREIGN PATENT DOCUMENTS

| | | |
|---|---|---|
| CN | 104049739 A | 9/2014 |
| CN | 104281257 A | 1/2015 |

(Continued)

OTHER PUBLICATIONS

Hutson, Finger devices let users 'touch' virtual objects, Science, AAAS, Apr. 25, 2017, 4 pages.

(Continued)

*Primary Examiner* — Afroza Chowdhury
(74) *Attorney, Agent, or Firm* — Treyz Law Group, P.C.; Kendall P. Woodruff

(57) ABSTRACT

A finger device may be worn on a user's finger and may serve as a controller for a head-mounted device or other electronic device. The finger device may have a housing having an upper housing portion that extends across a top of the finger and first and second side housing portions that extend down respective first and second sides of the finger. Displacement sensors in the side housing portions may measure movements of the sides of the finger as the finger contacts an external surface. To account for variations in skin compliance, the finger device and/or the electronic device may store calibration data that maps displacement values gathered by the displacement sensors to force values. The calibration data may be based on calibration measurements gathered while the user's finger wearing the finger device contacts a force sensor in an external electronic device.

20 Claims, 12 Drawing Sheets

(51) Int. Cl.
  *G06F 3/0346* (2013.01)
  *G06F 3/03* (2006.01)
  *G06T 7/20* (2017.01)
  *H04R 1/10* (2006.01)
  *G06F 3/02* (2006.01)
  *G06F 3/044* (2006.01)

(52) U.S. Cl.
  CPC .............. *G06F 2203/0331* (2013.01); *G06F 2203/04105* (2013.01); *G06T 2207/30196* (2013.01)

(56) References Cited

U.S. PATENT DOCUMENTS

| | | | |
|---|---|---|---|
| 6,388,247 | B2 | 5/2002 | Asada et al. |
| 8,368,641 | B2 | 2/2013 | Tremblay et al. |
| 8,610,548 | B1 | 12/2013 | Provancher |
| 8,724,861 | B1 | 5/2014 | Sun |
| 8,994,827 | B2 | 3/2015 | Mistry et al. |
| 9,104,271 | B1 | 8/2015 | Adams et al. |
| 9,110,505 | B2 | 8/2015 | Mastandrea |
| 9,711,060 | B1 | 7/2017 | Lusted et al. |
| 10,795,438 | B2 * | 10/2020 | Wang ............... G06F 3/016 |
| 2003/0214481 | A1 | 11/2003 | Xiong |
| 2005/0052412 | A1 | 3/2005 | McRae et al. |
| 2006/0103634 | A1 | 6/2006 | Kim et al. |
| 2007/0030246 | A1 | 2/2007 | Tremblay et al. |
| 2009/0096746 | A1 | 4/2009 | Kruse et al. |
| 2009/0153365 | A1 | 6/2009 | Salsedo et al. |
| 2009/0278798 | A1 | 11/2009 | Kim et al. |
| 2009/0287898 | A1 | 11/2009 | Kim et al. |
| 2010/0103106 | A1 | 4/2010 | Chui |
| 2010/0231505 | A1 | 9/2010 | Iwata |
| 2011/0210931 | A1 | 9/2011 | Shai |
| 2011/0213664 | A1 | 9/2011 | Osterhout et al. |
| 2013/0151960 | A1 | 6/2013 | Wiertlewski et al. |
| 2013/0162415 | A1 | 6/2013 | Kim et al. |
| 2014/0063060 | A1 | 3/2014 | Maciocci et al. |
| 2015/0248160 | A2 | 9/2015 | Provancher et al. |
| 2015/0277559 | A1 | 10/2015 | Vescovi et al. |
| 2016/0077582 | A1 * | 3/2016 | Song ............... G06F 3/0338 345/173 |
| 2016/0278665 | A1 | 9/2016 | Ferreira et al. |
| 2016/0287165 | A1 | 10/2016 | Abreu |
| 2016/0295989 | A1 | 10/2016 | Hakeem et al. |
| 2016/0313798 | A1 | 10/2016 | Connor |
| 2017/0003762 | A1 | 1/2017 | Ishii et al. |
| 2017/0045948 | A1 | 2/2017 | Nattukallingal |
| 2017/0090666 | A1 | 3/2017 | Pahud et al. |
| 2017/0143087 | A1 | 5/2017 | Cunningham |
| 2017/0188947 | A1 | 7/2017 | Connor |
| 2017/0192493 | A1 | 7/2017 | Ofek et al. |
| 2017/0212552 | A1 | 7/2017 | Stotler |
| 2017/0235332 | A1 | 8/2017 | Von Badinski et al. |
| 2017/0277367 | A1 | 9/2017 | Pahud et al. |
| 2017/0296363 | A1 | 10/2017 | Vetkin et al. |
| 2017/0330471 | A1 | 11/2017 | Subiakto |
| 2017/0357320 | A1 | 12/2017 | Chaudhri et al. |
| 2017/0367590 | A1 | 12/2017 | Sebe et al. |
| 2018/0286189 | A1 | 10/2018 | Motamedi et al. |
| 2020/0309661 | A1 * | 10/2020 | Spruit ............... H01S 5/02255 |

FOREIGN PATENT DOCUMENTS

| | | |
|---|---|---|
| CN | 105739612 A | 7/2016 |
| CN | 105739676 A | 7/2016 |
| CN | 106155306 A | 11/2016 |
| JP | 2001104256 A | 4/2001 |
| JP | 2008171409 A | 7/2008 |
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| KR | 1020140016122 A | 2/2014 |
| WO | 2012176610 A1 | 12/2012 |

OTHER PUBLICATIONS

Girard et al., HapTip: Displaying Haptic Shear Forces at the Fingertips for Multi-Finger Interaction in Virtual Environments, Frontiers in ICT, vol. 3, Article 6, Apr. 2016, 15 pages.

Aoki et al., Wearable Haptic Device to Present Contact Sensation Based on Cutaneous Sensation Using Thin Wire, Ace 2009, Oct. 29-Oct. 31, 2009, Athens, Greece.

Shilkrot et al., A Comprehensive Survey of Finger Augmentation Devices, ACM Computing Surveys, vol. 48, No. 2, Article 30, Publication date: Nov. 2015.

* cited by examiner

SYSTEMS FOR CALIBRATING FINGER DEVICES

FIELD

This relates generally to electronic devices, and, more particularly, to finger-mounted electronic devices.

BACKGROUND

Electronic devices such as computers can be controlled using computer mice and other input accessories. Input accessories can be used to control content that is displayed on a display and to take other actions. Some input accessories for computer systems may be cumbersome, uncomfortable, or unable to accommodate different users.

SUMMARY

A system may include a finger device that is worn on a user's finger. The finger device has sensor circuitry in a housing. The sensor circuitry may include a strain gauge, accelerometer, displacement sensor, and/or other sensor circuitry to detect finger input as the housing is moved by the finger. Wireless communications circuitry may be used to supply the finger input to other devices in the system such as a head-mounted device or other electronic device. During operation, finger input may be used to manipulate content displayed by the head-mounted device or other equipment in the system.

The finger device housing may include an upper housing portion that extends across a top of the finger and first and second side housing portions that extend down respective first and second sides of the finger. One or more sensors may be located in the side housing portions and may be configured to measure displacement of the sides of the finger as the finger contacts an external surface and makes other finger movements.

To account for variations in skin compliance, the finger device and/or the electronic device may store calibration data that maps displacement values gathered by the displacement sensors to force values. The calibration data may be based on calibration measurements gathered while the user's finger wearing the finger device contacts a force sensor in an external electronic device.

In some arrangements, calibration operations may be conducted with a camera instead of or in addition to a force sensor. For example, the user may wear the finger device on his or her finger while pressure is applied to the finger pad with another finger or an external surface. The camera may capture images of the user's fingers while the displacement sensors in the finger device gather displacement measurements. Based on the displacement measurements and the captured images, calibration data may be produced that maps displacement values to finger-to-finger offset amounts or finger deformation amounts.

DETAILED DESCRIPTION

Figure 1:
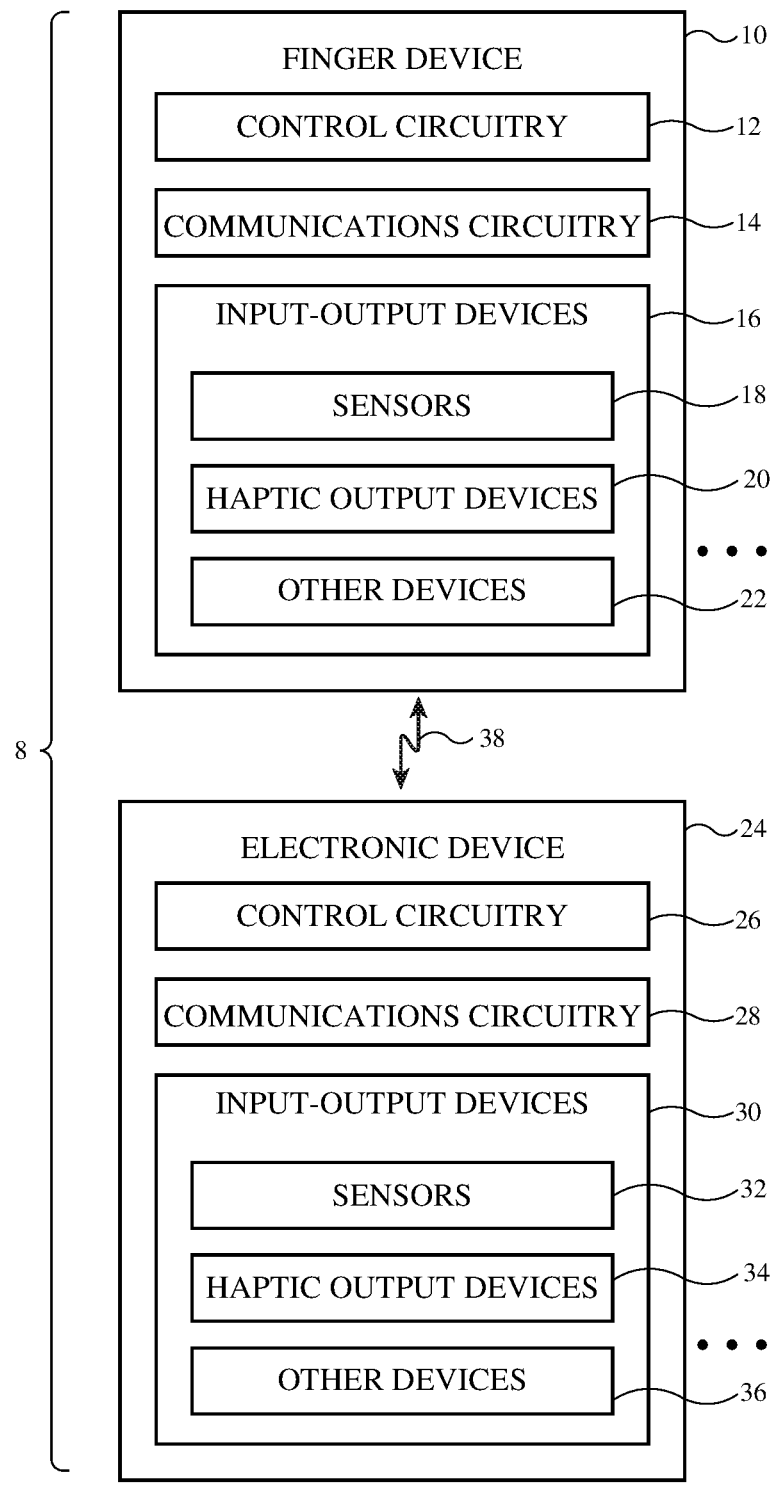
FIG. 1 is a schematic diagram of an illustrative system with a finger device in accordance with an embodiment.

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, may include a displacement sensor, force sensor, or other sensor for measuring movements of the sides of the finger as the finger contacts an external surface, and may include other sensors for gathering information on the interactions between the finger device (and the user's finger on which the device is mounted) and the surrounding environment. The finger device may include a haptic output device to provide the user's finger with haptic output and may include other output components.

One or more finger devices may gather user input from a user. The user may use finger devices in operating electronic devices. For example, a finger device may be used as a controller for a virtual reality or mixed reality device (e.g., head-mounted equipment such as glasses, goggles, a helmet, or other device with a display). During operation, the finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the finger devices. Haptic output may be used, for example, to provide the fingers of a user with a desired texture sensation as a user is touching a real object or as a user is touching a virtual object. Haptic output can also be used to create detents and other haptic effects.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. If desired, finger devices may be worn over knuckles on a user's finger, between knuckles, and/or on other portions of a user's finger. Finger devices may have a single segment (e.g., a single housing that fits over the end of a user's finger) or may have multiple segments (e.g., multiple housing portions that are flexibly coupled to each other so that they may be worn on respective segments of a user's finger). One or more finger devices may be worn at a time. The use of a finger device that is worn on a user's fingertip is sometimes described herein as an example.

Users can use finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, earbuds, or other accessory, or to interact with other electronic equipment.

FIG. 1 is a schematic diagram of an illustrative system of the type that may include one or more finger devices. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a finger-mounted device having a finger-mounted housing with a U-shaped body that grasps a user's finger or a finger-mounted housing with other shapes configured to rest against a user's finger and device(s) 24 is a cellular telephone, tablet computer, laptop computer, wristwatch device, head-mounted device, a device with a speaker, and/or other electronic device (e.g., a device with a display, audio components, and/or other output components, equipment that includes multiple devices such as a cellular telephone or computer that serves as a host and a head-mounted device that provides display functionality for the host, etc.). A finger device with a U-shaped housing may have opposing left and right sides that are configured to receive a user's finger and a top housing portion that couples the left and right sides and that overlaps the user's fingernail.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors (e.g., two-dimensional touch sensors), optical sensors such as optical sensors that emit and detect light, ultrasonic sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as sensors for measuring blood oxygen content and heart rates sensors, radio-frequency sensors (e.g., sensors that gather position information, three-dimensional radio-frequency images, and/or other information using radar principals or other radio-frequency sensing, sensors that detect position, orientation, and/or motion relative to other objects using Bluetooth® positioning techniques or using Ultra-wideband positioning techniques), muscle activity sensors (EMG) for detecting finger actions, optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors, gas sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 30.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals (e.g., wireless power transmitting coils and wireless power receiving coils, capacitive electrodes for wireless power transmission and/or wireless power reception, etc.).

Figure 2:
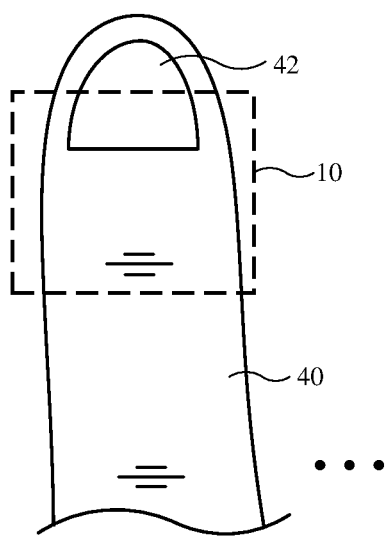
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers such as over a knuckle, between knuckles, etc. Configurations in which a device such as device 10 is worn between fingers 40 and/or in which a device such as device 10 has a housing configured to be worn on other body parts of a user may also be used.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
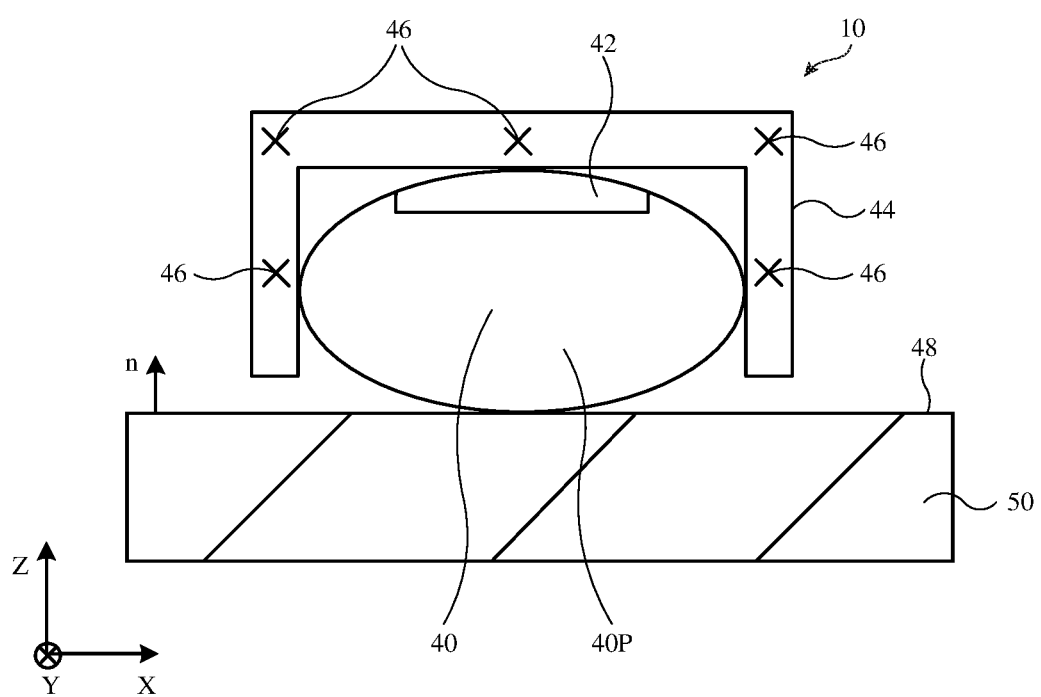
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16) within and/or on the surface(s) of finger device housing 44. These components may, if desired, be incorporated into other portions of housing 44.

As shown in FIG. 3, housing 44 may have a U shape (e.g., housing 44 may be a U-shaped housing structure that faces downwardly and covers the upper surface of the tip of user finger 40 and fingernail 42). During operation, a user may press against structures such as structure 50. As the bottom of finger 40 (e.g., finger pulp or finger pad 40P) presses against surface 48 of structure 50, the user's finger may compress and force portions of the finger outwardly against the sidewall portions of housing 44 (e.g., for sensing by force sensors, displacement sensors, or other sensors mounted to the side portions of housing 44). Lateral movement of finger 40 in the X-Y plane may also be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces).

Ultrasonic sensors, optical sensors, inertial measurement units, strain gauges and other force sensors, radio-frequency sensors, and/or other sensors may be used in gathering sensor measurements indicative of the activities of finger 40. If desired, these sensors may also be used in mapping the contours of three-dimensional objects (e.g., by time-of-flight measurements and/or other measurements). For example, an ultrasonic sensor such as a two-dimensional image sensor or an ultrasonic sensor with a single ultrasonic transducer element may emit free-space ultrasonic sound signals that are received and processed after reflecting off of external objects. This allows a three-dimensional ultrasonic map to be generated indicating the shapes and locations of the external objects.

In some configurations, finger activity information (position, movement, orientation, etc.) may be gathered using sensors that are mounted in external electronic equipment (e.g., in a computer or other desktop device, in a head-mounted device or other wearable device, and/or in other electronic device 24 that is separate from device 10). For example, optical sensors such as images sensors that are separate from devices 10 may be used in monitoring devices 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices such as light-emitting diodes and/or lasers. The light-emitting devices may be arranged in an asymmetric pattern on housing 44 and may emit light that is detected by an image sensor, depth sensor, and/or other light-based tracking sensor circuitry in device 24. By processing the received patterned of emitted light, device 24 can determine the position, orientation, and/or motion of device 10.

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other finger device tracking arrangements may be used, if desired. In some arrangements, user input for controlling system 8 can include both user finger input and other user input (e.g., user eye gaze input, user voice input, etc.). For example, gaze tracking information such as a user's point-of-gaze measured with a gaze tracker can be fused with finger input when controlling device 10 and/or devices 24 in system 8. The finger input may include information on finger orientation, position, and/or motion and may include information on how forcefully a finger is pressing against surfaces (e.g., force information).

The sensors in device 10 may, for example, measure how forcefully a user is moving device 10 (and finger 40) against surface 48 (e.g., in a direction parallel to the surface normal n of surface 48 such as the −Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other structure that the user can contact with finger 40 while moving finger 40 in a desired direction with a desired force. Because motions such as these can be sensed by device 10, device(s) 10 can be used to gather pointing input (e.g., input moving a cursor or other virtual object on a display such as a display in devices 36), can be used to gather tap input, swipe input, pinch-to-zoom input (e.g., when a pair of devices 10 is used), or other gesture input (e.g., finger gestures, hand gestures, arm motions, etc.), and/or can be used to gather other user input.

In general, user input gathered by device 10 may be used in controlling any suitable operations in system 8. As an example, system 8 (e.g., one or more devices such as device 24 and/or other equipment in system 8) may change the content displayed for a user by a display device (e.g., a head-mounted display in a head-mounted device or other display) in response to the user input. A pointer may be moved within a displayed image (e.g., to point to a virtual object or real-world object in the user's field of view), lines may be drawn by moving a pointer or virtual paintbrush, content can be scrolled (e.g., in response to user scroll up and scroll down commands received by monitoring deformation of the item), etc. Highlight regions (e.g., a computer-generated visual highlighting element such as a ring, enlarged area, brightened or darkened area, etc.) may also be moved in response to user input. User input may be used to direct system 8 to select highlighted items (e.g., to launch an application, to select media for playback, to perform a file action such as deleting, copying, renaming, etc.). If desired, user input may be used to change pages of displayed content (e.g., to advance through pages in a visual presentation, to move through the pages of a book, etc.). User input may also be used to adjust audio settings, to select a media track, to perform fast forward, reverse, pause, stop, and play operations, and/or to otherwise control the playback of media content containing video, audio, and/or haptic feedback. System 8 may have user adjustable settings such as account settings, user playback settings, and/or other settings. User input from device 10 may be used in adjusting these settings and/or other adjustable parameters in system 8. Device 10 may, as an example, provide finger input information directly to device 24 (e.g., a head-mounted display device) or may provide finger input information to a first device (e.g., a computer or cellular telephone serving as a host) while the first device uses a display in a second device (e.g., a display in a head-mounted device) to display content in response to the finger input information.

If desired, finger device 10 may be placed on a user's finger by pressing housing 44 into place over the top of the tip of the finger. This type of arrangement, which may sometimes be referred to as a press-fit or friction-fit arrangement, may accommodate a range of finger sizes, particularly in configurations in which housing 44 has portions that deform (e.g., by flexing). When it is desired to remove device 10 from the user's finger, housing 44 may be pulled off of the tip of the user's finger.

Another illustrative arrangement involves providing device 10 with adjustable housing structures such as one or more hinges or other structures that allow device 10 to fold and unfold. When it is desired to attach device 10 to the user's finger, device 10 can be folded into its folded state so that device 10 squeezes inwardly against the sides of the user's finger. When it is desired to remove device 10 from the user's finger, device 10 can be unfolded and thereby freed from the finger.

Figure 4:
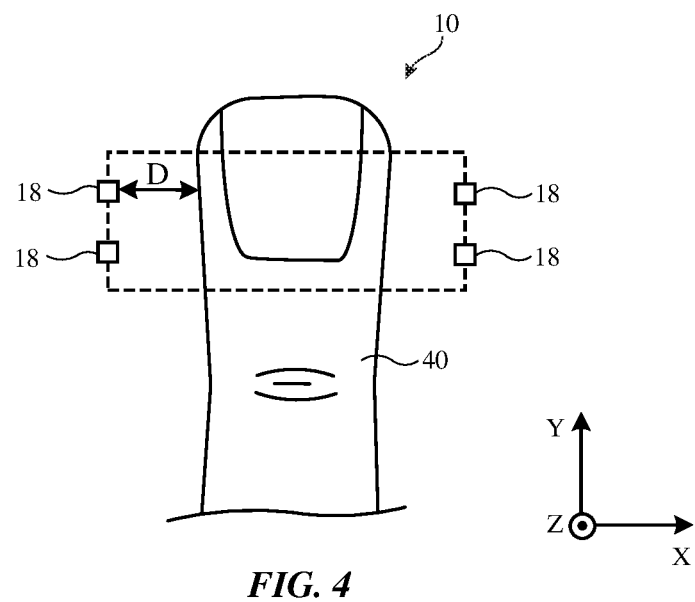
FIG. 4 is a top view of an illustrative finger device with displacement sensors that measure changes in distance between the displacement sensors and the side portions of the finger in accordance with an embodiment.

FIG. 4 is a top view of an illustrative finger device on a finger of a user. In the illustrative configuration of FIG. 4, device 10 includes one or more sensors such as sensors 18. Sensors 18 (sometimes referred to as proximity sensors, distance sensors, displacement sensors, etc.) may each be configured to measure a distance D between the side portions of finger 40 and sensor 18. The distances between finger 40 and sensors 18 may change as the user moves finger 40 in the air, touches finger 40 on a surface, and/or touches finger 40 with another finger. Based on the distance changes recorded by each sensor 18, control circuitry 12 may determine how finger 40 is moving and may take corresponding action. For example, control circuitry 12 may send control signals to one or more electronic devices (e.g., device 24 of FIG. 1) in response to the finger movements measured by sensors 18.

Sensors 18 may be optical sensors (e.g., having a light source and a light detector that gathers time-of-flight measurements), ultrasonic sensors (e.g., having an ultrasonic transducer and a corresponding detector), magnetic sensors, capacitive sensors, pressure sensors, and/or other sensors configured to gather information on the distance D between finger 40 and sensors 18. Arrangements in which sensors 18 are based on piezoelectric materials or based on mechanical switches may also be used, if desired.

In one illustrative arrangement, which may sometimes be described herein as an example, sensors 18 may include self-mixing interferometric proximity sensors (sometimes referred to as self-mixing optical proximity sensors, self-mixing proximity sensors, self-mixing interferometers, etc.). A self-mixing proximity sensor may have a coherent or partially coherent source of electromagnetic radiation. The source of radiation may, for example, be a coherent light source such as an infrared vertical cavity surface-emitting laser, a quantum cascade laser, or other laser. The self-mixing proximity sensor may also have a light detector such as a photodiode and/or other electromagnetic-radiation-sensitive element. Self-mixing proximity sensors may have submicron resolution and may be configured to detect very small changes in distance. This allows sensors 18 to detect very small movements of finger 40 (sometimes referred to as microgestures or nanogestures). This is, however, merely illustrative. If desired, other types of distance sensors may be used to measure changes in distance between sensor 18 and the user's finger.

Figure 5:
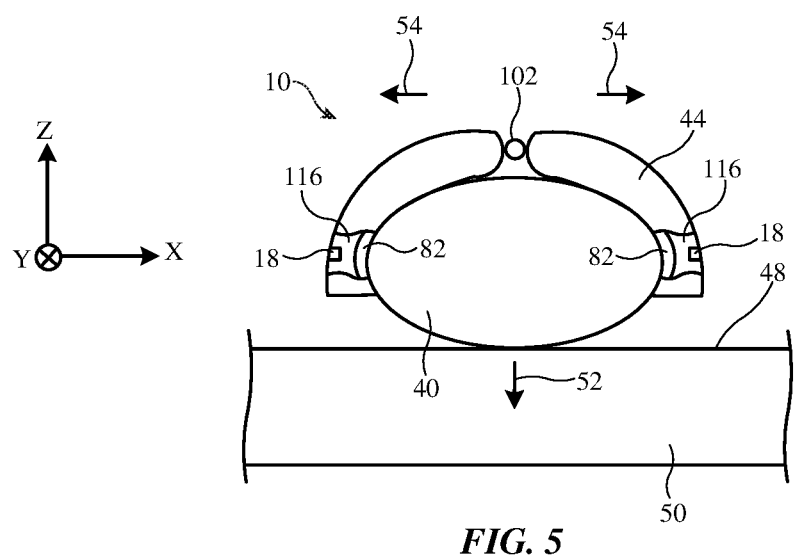
FIG. 5 is a cross-sectional side view of an illustrative finger device with displacement sensors that measure displacement of the side portions of the finger as the finger pad contacts an external surface in accordance with an embodiment.

FIG. 5 is a cross-sectional side view of an illustrative finger device with sensors 18. As shown in FIG. 5, housing 44 may include a upper portion that extends across a top portion of finger 40 and side portions that extend down respective first and second side portions of finger 40. If desired, a hinge such as hinge 102 may be coupled between the side portions of housing 44 to allow the side portions of housing 44 to move relative to one another and clamp onto finger 40. One or more of sensors 18 may be mounted in the side portions of housing 44 to detect movements of the side portions of finger 40.

Sensors 18 may be separated from target 82 by cavity 116. Cavity 116 may be filled with air, fluid, and/or other suitable material through which signals associated with sensor 18 may pass. For example, sensor 18 may emit signals (e.g., optical signals, ultrasonic signals, etc.) towards membrane 82 and may detect the reflected signals that reflect from membrane 82. In the example of FIG. 5, target 82 is a flexible membrane (e.g., a flexible layer of silicone, polymer, or other material) that rests against the sides of finger 40. As finger 40 moves, the distance between membrane 82 and sensor 18 may change. For example, as finger 40 presses down in direction 52 on surface 48 of structure 50, the side portions of finger 40 may be compressed outwardly in directions 54. The compression of finger 40 also presses membranes 82 in directions 54, causing the distance between membrane 82 and sensor 18 to decrease. The change in distance between membrane 82 and sensor 18 may be measured by sensor 18 to thereby detect the downward press of finger 40 in direction 52. In this way, sensors 18 can detect different finger gestures (e.g., finger gestures such as taps, presses, swipes, pinches, etc.) by measuring the micro-movements of the side portions of the finger.

The example of finger 40 pressing down on surface 48 is merely illustrative. In general, sensors 18 may be used to detect any movement of the side portions of finger 40. For example, forces may be applied to the finger pulp of finger 40 by another one of the user's fingers (e.g., device 10 may be worn on an index finger and sensor 18 may detect when the user pinches his or her thumb against the index finger).

In arrangements where sensors 18 include self-mixing proximity sensors, sensors 18 may include a laser such as vertical cavity surface emitting laser or other coherent or partially coherent source of light or other electromagnetic radiation. The laser may have an active region between thin-film interference filter mirrors (sometimes referred to as Bragg reflectors). One of the mirrors may be mostly or completely reflective while the other mirror may have slightly lower reflectivity so that laser light can exit the cavity towards membrane 82. Sensing circuitry in circuitry 12 may be used to measure the light output of the laser. The emitted light may have a wavelength of 850 nm or other suitable wavelength (e.g., a visible wavelength, an ultraviolet wavelength, an infrared wavelength, a near-infrared wavelength, etc.). When the emitted light illuminates membrane 82, some of the emitted light will be reflected backwards towards sensor 18. Sensor 18 may include a light sensitive element (e.g., a photodiode or other light detector) that produces output signals in response to reception of the reflected light. In addition to using a photodiode, self-mixing can be detected using laser junction voltage measurements (e.g., if the laser is driven at a constant bias current) or laser bias current (e.g., if the laser is driven at a constant voltage).

Some of the light that is reflected or backscattered from membrane 82 may reenter the laser cavity of the laser and perturb the electric field coherently, which also reflects as a perturbation to the carrier density in the laser. These perturbations in the laser cause coherent self-mixing fluctuations in the power of the emitted light and associated operating characteristics of the laser (e.g., laser junction voltage and/or laser bias current). These fluctuations may be monitored. For example, the fluctuations in the power of the laser light may be monitored using the photodiode in sensor 18.

A modulation scheme (e.g., a sinusoidal modulation scheme) may be used for driving the laser for the purpose of inducing a wavelength modulation, and a photodiode signal processing scheme or junction voltage or bias current processing scheme is used in processing the measured self-mixing fluctuations in output power to that allow control circuitry 12 to determine the distance between proximity sensor 18 and target 82 in accordance with the principles of self-mixing interferometry.

The use of self-mixing optical proximity sensors for sensors 18 is merely illustrative. Sensors 18 may be other types of optical sensors (e.g., an infrared proximity sensor having an infrared light emitter and an infrared light detector), ultrasonic sensors (e.g., having a ultrasonic transducer and a corresponding detector), piezoelectric sensors, magnetic sensors, capacitive sensors, pressure sensors, and/or other sensors configured to gather information on the location and movement of finger 40. If desired, sensor 18 may include a pressure sensor (e.g., in addition to or instead of a distance sensor) in cavity 116 that measures barometric pressure changes as membrane 82 moves in response to finger movement. Arrangements in which membrane 82 incorporates one or more force sensors may also be used. For example, membrane 82 may include a strain gauge for measuring force and/or may include a capacitive electrode that is used to measure force (e.g., by detecting a change in distance between the electrode on membrane 82 and an electrode in sensor 18).

It may be desirable to calibrate sensors 18 to account for variations in skin compliance. For example, different users may have different levels of skin compliance and/or different fingers on a user's hand may have different levels of skin compliance. Difference skin compliance levels will result in different relationships between force (e.g., force of finger 40 in direction 52 of FIG. 5) and displacement (e.g., the resulting changes in distance D of FIG. 4). Factors such as hardness, blood content, and hydration level can affect skin compliance and result in different force-displacement relationships from finger to finger and user to user. To account for such compliance variations, system 8 may be used to conduct a calibration procedure to determine an appropriate mapping algorithm to map the measured displacement to an estimated amount of force applied.

Figure 6:
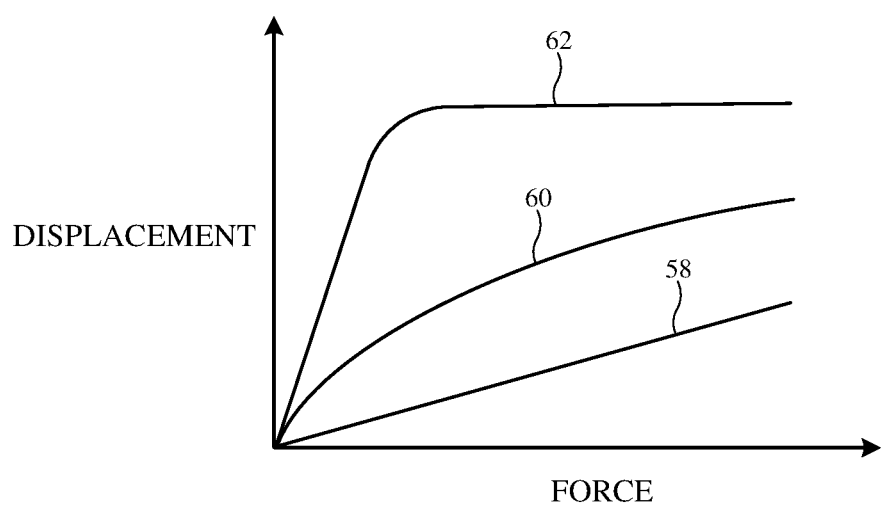
FIG. 6 is a graph showing illustrative force-displacement curves for different skin compliance levels in accordance with an embodiment.

Illustrative calibration data that may be stored in device 10 and/or device 24 is shown in FIG. 6. The graph of FIG. 6 illustrates different force-displacement curves such curves 58, 60, and 62. Each curve is associated with a different skin compliance level. Curve 58 may correspond to calibration data for users with less compliant skin, where only a small amount of displacement of the side of the finger results from a larger force applied to the finger pad. Curve 60 may correspond to calibration data for users with medium compliant skin, where a moderate amount of displacement of the side of the finger results from a larger force applied to the finger pad. Curve 62 may correspond to calibration data for users with more compliant skin, where a significant amount of displacement of the side of the finger results from a larger force applied to the finger. During calibration, control circuitry 12 and/or control circuitry 26 may measure the force-displacement curve for the user and may store the force-displacement curve in device 10 and/or device 24. The curve may be a best fit curve based on gathered force and displacement measurements and/or may be one of a predetermined set of curves that is the best match for the user based on the gathered force and displacement measurements.

During operation of device 10, control circuitry 12 and/or control circuitry 26 may use the stored calibration data to map the measured displacement values detected by sensors 18 to the appropriate force values.

Figure 7:
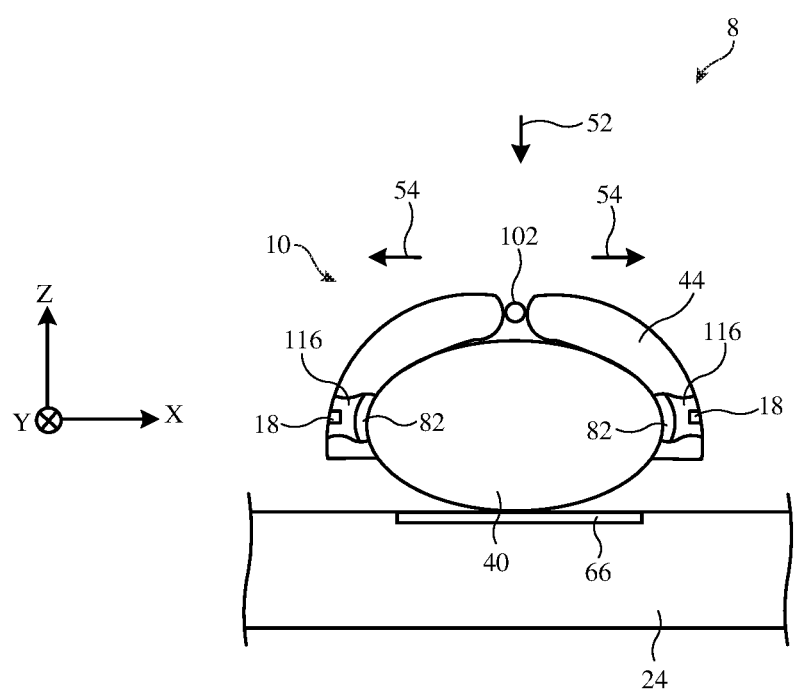
FIG. 7 is a cross-sectional side view of an illustrative system for calibrating displacement sensors in a finger device using a force sensor in an external electronic device in accordance with an embodiment.

FIG. 7 is a cross-sectional side view of system 8 showing how sensors 18 in device 10 may be calibrated for different users and/or for different fingers of a user's hands. As shown in FIG. 7, device 10 may be worn on finger 40 while finger 40 applies force in direction 52 to a force sensor in an external electronic device such as electronic device 24. As finger 40 applies force on force sensor 66, sensors 18 may measure displacement of the sides of the finger (e.g., changes in distance between membrane 82 and sensor 18 as the sides of finger 40 are pressed outwardly in directions 54) while sensor 66 measures the force in direction 52. These calibration measurements (e.g., displacement measurements from sensors 18 corresponding to an amount of displacement of the side portions of finger 40 and force measurements from sensor 66 corresponding to an amount of force applied by finger 40 on sensor 66) may be processed to produce corresponding calibration data that can be stored in device 10 and/or device 24. During operation of device 10, control circuitry 12 and/or control circuitry 26 may use the stored calibration data to map the displacement measurements from sensors 18 to the appropriate force values.

Force sensor 66 may be a capacitive force sensor, a resistive force sensor, a strain gauge, a piezoelectric force sensor, and/or any other suitable force sensor. Force sensor 66 may be a standalone force sensor in device 24 and/or may be part of a touch-sensitive display, button, switch, trackpad, fingerprint sensor, or other input device in device 24. Force sensor 66 may be a single-threshold sensor that detects whether the applied force is greater or less than a single threshold, may be a multiple-threshold sensor that detects whether the applied force is greater or less than multiple thresholds (e.g., low, medium, and high thresholds), or force sensor 66 may be a continuous force sensor that continuously measures the precise amount of force being applied on force sensor 66. Force sensor 66 may be configured to measure changes in force over time. For example, force sensor 66 may measure how the applied force in direction 52 changes as finger 40 presses down on sensor 66 and as finger 40 lifts away from sensor 66.

In some arrangements, calibration operations may take place as a dedicated user enrollment process in which the user is guided through the calibration procedure (e.g., by providing instructions from the output devices of device 10, device 24, and/or other device in system 8). For example, a display, speaker, and/or other output device in device 24 may provide instructions to the user such as instructing the user where to touch on device 24 with finger 40, how hard to press with finger 40, how and when to release finger 40, etc. The user may be instructed to tap, double tap, press and hold, swipe, and/or perform other finger gestures on sensor 66 while sensor 66 gathers force measurements and sensors 18 gather displacement measurements.

In other arrangements, calibration operations may take place during a user's normal operation of device 10 and device 24. For example, force sensor 66 may form part of an input device (e.g., a power button, a touch sensor, a trackpad, a fingerprint sensor, etc.) that the user may provide input to while wearing device 10. Calibration measurements (e.g., force measurements from sensor 66 and displacement measurements from sensors 18) may be gathered while the user is providing input to sensor 66 during normal operation of device 10 and device 24 (e.g., while the user is turning on device 24 using a button that contains sensor 66, while the user is adjusting a volume of audio output using a button that contains sensor 66, while the user is providing touch input to a display in device 24, while the user is providing touch input to a trackpad in device 24, etc.). These examples are merely illustrative. If desired, force sensor 66 may be incorporated into other input devices or may not be associated with any input device. For example, sensor 66 may be placed in a location of device 24 that the user touches when holding device 24 (e.g., sensor 66 may be located on a portion of the housing of device 24 where the user normally grasps when picking up, putting down, or otherwise holding device 24). Calibration measurements (e.g., force measurements from sensor 66 and displacement measurements from sensors 18) may be gathered while the user is holding device 24 (e.g., holding device 24 in a way where the finger wearing device 10 contacts sensor 66) during normal operation of device 10 and device 24.

Arrangements in which calibration measurements are gathered during both an initial dedicated calibration process and on an ongoing behind-the-scenes basis while devices 10 and 24 are in use may also be used, if desired.

If desired, the user may calibrate device 10 for multiple fingers. For example, the user may wear device 10 on one finger and may press on force sensor 66 while first calibration measurements are gathered with sensor 66 and sensors 18. The user may then move device 10 to a different finger and may press on force sensor 66 while second calibration measurements are gathered with sensor 66 and sensors 18. Calibration data corresponding to different fingers may be stored in device 10 and/or device 24 so that any variations in skin compliance from finger-to-finger can be compensated for.

FIGS. 8, 9, 10, 11, and 12 show illustrative examples of different devices 24 that may be used to gather calibration measurements for calibrating sensors 18 in device 10. These examples are merely illustrative. Device 24 may be any suitable device with a force sensor and/or may be a dedicated stand-alone calibration device with a force sensor 66.

Figure 8:
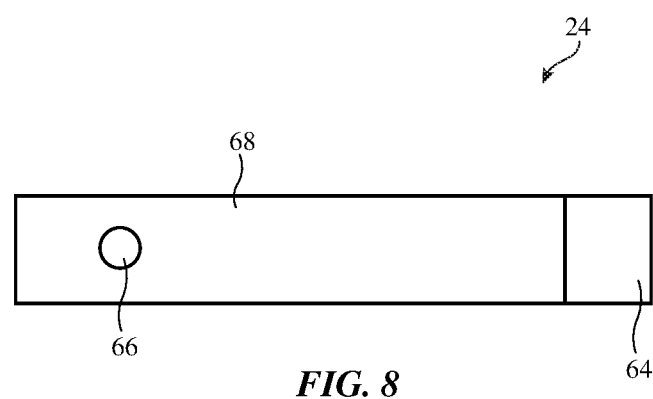
FIG. 8 is a side view of an illustrative head-mounted device with a force sensor that may be used to calibrate a finger device in accordance with an embodiment.

In the example of FIG. 8, device 24 is a head-mounted device (e.g., a pair of glasses, goggles, a helmet, a hat, etc.). Device 24 may include support structures such as support structures 68. Support structures 68 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 24 and may support display(s) 64, sensors such as force sensor 66, and/or other components such as input-output devices 30 and control circuitry 26 (FIG. 1).

In configurations in which electronic device 24 is a head-mounted device, support structures 68 may include, for example, structures that form housing walls and other structures for a main housing unit (e.g., exterior housing walls, lens module structures, other support structures for housing electronic components such as left and right display modules, etc.) and straps or other supplemental support structures that help to hold the main housing unit on a user's face so that the user's eyes are located within eye boxes.

Display 64 may include left and right display panels (e.g., left and right pixel arrays, sometimes referred to as left and right displays or left and right display portions) that are mounted respectively in left and right display modules. Each display module may include lenses that focus light from the display in a desired manner. Display 64 in head-mounted device 24 may include a source of images such as a pixel array. The pixel array may include a two-dimensional array of pixels that emits image light. The pixels in display 64 may include organic light-emitting diode pixels, light-emitting diode pixels formed from semiconductor dies, liquid crystal display pixels with a backlight, liquid-crystal-on-silicon pixels with a frontlight, and/or any other suitable type of pixels.

Display 64 may be used to display virtual reality content, mixed reality content, and/or augmented reality content. Users can use finger devices such as device 10 to interact with device 24 (e.g., by providing finger input with device 10 that is used to control device 24 and/or to control content on display 64).

Force sensor 66 may be a dedicated calibration force sensor on device 24, may be part of an input device (e.g., a button, a switch, a touch sensor, and/or other input device for powering device 24 on and off, for changing an operating mode of device 24, for changing a volume of audio from device 24, for adjusting a brightness of display 64, for detecting a fingerprint, etc.) in device 24, and/or may be a force sensor in device 24 that detects forces from a user's hands when holding device 24.

Calibration operations may take place during normal operation of devices 10 and 24 and/or may take place during a dedicated calibration procedure. During calibration operations, a user may press, swipe, tap, double tap, or otherwise contact force sensor 66 on device 24 with a finger that is wearing device 10. Force sensor 66 may gather force measurements while sensors 18 gather displacement measurements corresponding to the displacement of the side portions of the user's finger as the finger compresses against force sensor 66. These calibration measurements may be processed to produce calibration data that can be stored in device 10 and/or device 24. During subsequent use of device 10 (e.g., when device 10 is being used with device 24 of FIG. 8 or any other device 24), control circuitry 12 and/or control circuitry 26 may use the stored calibration data to map the displacement measurements from sensors 18 to the appropriate force values.

Figure 9:
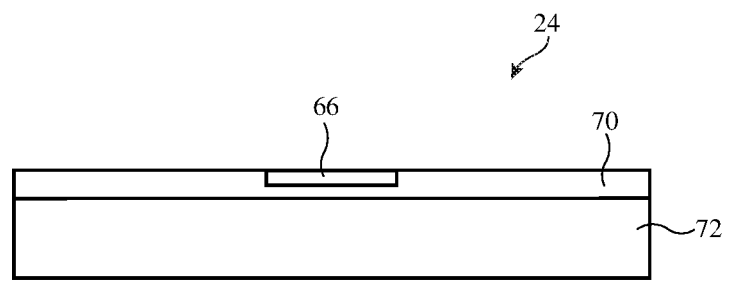
FIG. 9 is a cross-sectional side view of an illustrative electronic device with a force sensor that detects forces on a touch-sensitive display and that may be used to calibrate a finger device in accordance with an embodiment.

In the example of FIG. 9, device 24 is portable electronic device such as a cellular telephone, a wrist watch, a tablet, and/or any other suitable electronic device having a touch-sensitive display 70 mounted in a housing 72. For example, device 24 may have opposing front and rear faces and display 70 may be mounted in housing 72 so that display 70 covers the front face of device 24. Housing 72, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 72 may be formed using a unibody configuration in which some or all of housing 72 is machined or molded as a single structure or may be formed using multiple structures (e.g., an internal frame structure, one or more structures that form exterior housing surfaces, etc.). If desired, different portions of housing 72 may be formed from different materials. For example, housing sidewalls may be formed from metal and some or all of the rear wall of housing 72 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example). Housing 72 may support display 70, sensors such as force sensor 66, and/or other components such as input-output devices 30 and control circuitry 26 (FIG. 1).

Display 70 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.). Capacitive touch screen electrodes may be formed from an array of indium tin oxide pads or other transparent conductive structures.

Display 70 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 70 may be protected using a display cover layer such as a layer of transparent glass, clear plastic, sapphire, or other transparent dielectric. Openings may be formed in the display cover layer. For example, an opening may be formed in the display cover layer to accommodate a button. Buttons may also be formed from capacitive touch sensors, light-based touch sensors, or other structures that can operate through the display cover layer without forming an opening.

Force sensor 66 may be a dedicated calibration force sensor on device 24, may be part of an input device (e.g., a button, a switch, a touch sensor, and/or other input device for powering device 24 on and off, for changing an operating mode of device 24, for changing a volume of audio from device 24, for adjusting a brightness of display 70, for detecting a fingerprint, etc.) in device 24, and/or may be a force sensor in device 24 that detects forces from a user's hands when holding device 24. In the example of FIG. 9, force sensor 66 forms part of touch-sensitive display 70. For example, display 70 may be a force-sensitive display that includes pressure sensors for measuring how hard a user presses on display 70. Sensor 66 may be integrated throughout display 70 and/or may be located at the perimeter or corners of display 70.

Calibration operations may take place during normal operation of devices 10 and 24 and/or may take place during a dedicated calibration procedure. During calibration operations, a user may press, swipe, tap, double tap, or otherwise contact force sensor 66 on device 24 with a finger that is wearing device 10. Force sensor 66 may gather force measurements while sensors 18 gather displacement measurements corresponding to the displacement of the side portions of the user's finger as it compresses against force sensor 66. These calibration measurements may be processed to produce calibration data that can be stored in device 10 and/or device 24. During subsequent use of device 10 (e.g., when device 10 is being used with device 24 of FIG. 8 or any other device 24), control circuitry 12 and/or control circuitry 26 may use the stored calibration data to map the displacement measurements from sensors 18 to the appropriate force values.

Figure 10:
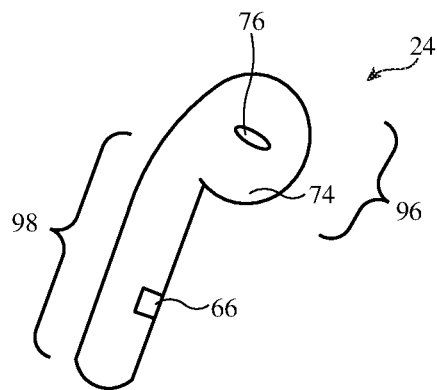
FIG. 10 is a perspective view of an illustrative earbud with a force sensor that may be used to calibrate a finger device in accordance with an embodiment.

In the example of FIG. 10, device 24 is an accessory such as an audio device. For example, device 24 may be an earbud, in-ear headphones, over-the-ear headphones, wired or wireless headphones, other suitable earphones, a portable speaker, and/or any other suitable accessory device.

Earbud 24 may have a housing such as housing 74. Housing 74 may have one or more housing walls formed from polymer, glass, ceramic, metal, other materials, and/or combinations of these materials. The inner surfaces of the housing wall forming housing 74 may have planar portions and/or curved portions.

The shape of housing 74 may be selected to form an enclosure suited to the type of device 24 for which the housing is being used. As examples, in scenarios in which device 24 is a voice-controlled electronic device, housing 74 may be cylindrical, pyramidal, box-shaped, conical, spherical, or other shapes suitable for enclosing one or more speakers. In configurations in which device 24 is a headphone or earpiece device, housing 74 may have a shape configured to fit on or in a user's ear. Openings may be formed in housing 74. For example, housing 74 may include speaker port opening 76 to allow sound that is produced by a speaker in housing 74 to exit housing 74.

Housing 74 (and earbud 24) may have an ear portion such as ear portion 96 configured to be received within the ear of a user and may have a stalk portion such as elongated stalk portion 98 (sometimes referred to as an out-of-ear portion) that is configured to protrude away from ear portion 96 and out of the user's ear. A user may hold stalk portion 98 when placing ear portion 96 into the user's ear. Earbud 24 may include sensing circuitry (e.g., capacitive sensors, optical sensors, motion sensors such as accelerometers, and/or other sensors) for detecting finger touch gestures (e.g., swipes, taps, double taps, presses, etc.) on stalk portion 98 and/or on ear portion 96.

Force sensor 66 may be a dedicated calibration force sensor on device 24, may be part of the sensing circuitry that detects finger gestures on stalk portion 98 (e.g., finger gestures for adjusting volume, pausing media playback, changing audio tracks, performing wireless pairing with another device, etc.) of device 24, and/or may be a force sensor in device 24 that detects forces from a user's hands when holding device 24.

Calibration operations may take place during normal operation of devices 10 and 24 and/or may take place during a dedicated calibration procedure. During calibration operations, a user may press, swipe, tap, double tap, or otherwise contact force sensor 66 on device 24 with a finger that is wearing device 10. Force sensor 66 may gather force measurements while sensors 18 gather displacement measurements corresponding to the displacement of the side portions of the user's finger as it compresses against force sensor 66. These calibration measurements may be processed to produce calibration data that can be stored in device 10 and/or device 24. During subsequent use of device 10 (e.g., when device 10 is being used with device 24 of FIG. 8 or any other device 24), control circuitry 12 and/or control circuitry 26 may use the stored calibration data to map the displacement measurements from sensors 18 to the appropriate force values.

Figure 11:
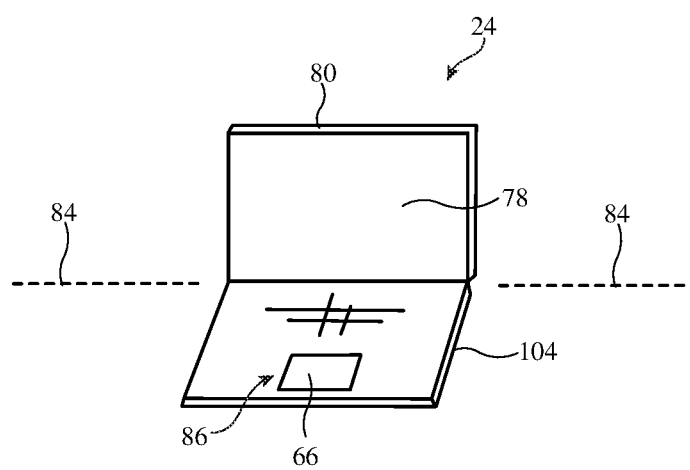
FIG. 11 is a perspective view of an illustrative laptop with a force sensor that detects forces on a trackpad and that may be used to calibrate a finger device in accordance with an embodiment.

In the example of FIG. 11, electronic device 24 is a laptop computer having a housing with upper housing portion 80 and lower housing portion 104 coupled by a hinge that allows housing portions 80 and 104 to rotate relative to one another about axis 84. Electronic device 24 may have input-output devices such as display 78, trackpad 86, and a keyboard.

Force sensor 66 may be a dedicated calibration force sensor on device 24, may be part of an input device (e.g., a button, a switch, a touch sensor, and/or other input device for powering device 24 on and off, for changing an operating mode of device 24, for changing a volume of audio from device 24, for adjusting a brightness of display 70, for detecting a fingerprint, etc.) in device 24, and/or may be a force sensor in device 24 that detects forces from a user's hands when holding device 24. In the example of FIG. 11, force sensor 66 forms part of trackpad 86. For example, trackpad 86 may be a force-sensitive trackpad that includes force sensors for measuring how hard a user presses on trackpad 86. Sensor 66 may be integrated throughout trackpad 86 and/or may be located at the perimeter or corners of trackpad 86.

Calibration operations may take place during normal operation of devices 10 and 24 and/or may take place during a dedicated calibration procedure. During calibration operations, a user may press, swipe, tap, double tap, or otherwise contact force sensor 66 on device 24 with a finger that is wearing device 10. Force sensor 66 may gather force measurements while sensors 18 gather displacement measurements corresponding to the displacement of the side portions of the user's finger as it compresses against force sensor 66. These calibration measurements may be processed to produce calibration data that can be stored in device 10 and/or device 24. During subsequent use of device 10 (e.g., when device 10 is being used with device 24 of FIG. 8 or any other device 24), control circuitry 12 and/or control circuitry 26 may use the stored calibration data to map the displacement measurements from sensors 18 to the appropriate force values.

Figure 12:
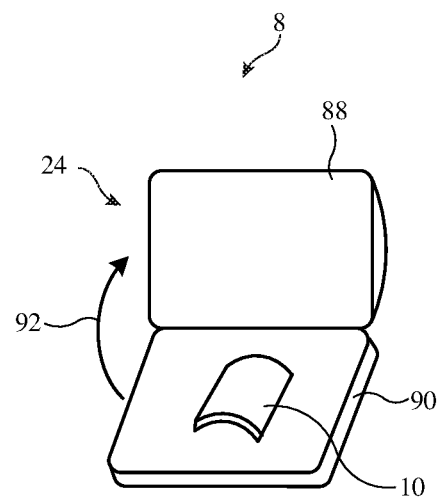
FIGS. 12 and 13 are perspective views of an illustrative storage case with a force sensor that may be used to calibrate a finger device in accordance with an embodiment.
Figure 13:
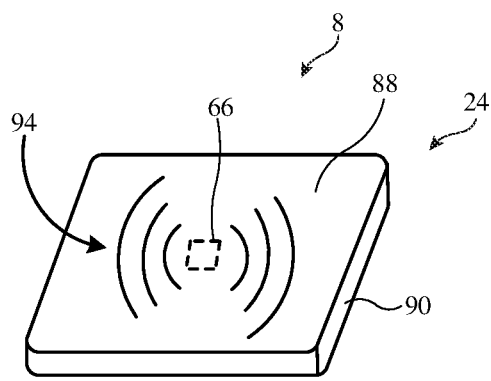

FIGS. 12 and 13 illustrate an arrangement in which device 24 is a storage case for device 10. As shown in FIG. 12, device 24 may be a case (e.g., a storage enclosure for device 10, which may sometimes be referred to as a battery case). In this type of arrangement, device 24 may include a power source (e.g., a power source with a battery) for charging device 10 when device 10 is placed within the case. In the illustrative configuration of FIG. 12, device 24 has a first portion (e.g., a first housing portion) such as portion 88 that rotates open in direction 92 relative to a second portion (e.g., a second housing portion) such as portion 90. Flexible housing portions (e.g., portions of a plastic layer), interlocking metal hinge members, and/or other hinge structures may be provided between housing portions 88 and 90 to allow housing portions 88 and 90 to rotate relative to one another. Recesses (e.g., device-shaped grooves or other structures) may be formed in the first and/or second portions of the housing of device 24 and may be configured to receive device 10 for storage within the interior of device 24.

FIG. 13 shows storage device 24 of FIG. 12 in a closed position. As shown in FIG. 13, an exterior surface of device 24 may incorporate force sensor 66. Force sensor 66 may be a dedicated calibration force sensor on device 24, may be part of an input device (e.g., a button, a switch, a touch sensor, and/or other input device to adjust an operating mode of device 24 and/or device 10, to initiate wireless pairing with device 10 and/or other device, etc.) in device 24, and/or may be a force sensor in device 24 that detects forces from a user's hands when holding device 24.

Calibration operations may take place during normal operation of devices 10 and 24 and/or may take place during a dedicated calibration procedure. During calibration operations, a user may press, swipe, tap, double tap, or otherwise contact force sensor 66 on device 24 with a finger that is wearing device 10. Force sensor 66 may gather force measurements while sensors 18 gather displacement measurements corresponding to the displacement of the side portions of the user's finger as it compresses against force sensor 66. These calibration measurements may be processed to produce calibration data that can be stored in device 10 and/or device 24. During subsequent use of device 10 (e.g., when device 10 is being used with device 24 of FIG. 8 or any other device 24), control circuitry 12 and/or control circuitry 26 may use the stored calibration data to map the displacement measurements from sensors 18 to the appropriate force values.

If desired, device 24 may provide output (e.g., visual output, audio output, haptic output, etc.) to indicate when device 10 has been successfully calibrated. For example, as shown in FIG. 13, device 24 may illuminate force sensor 66 with light 94 when device 10 has been successfully calibrated.

Figure 14:
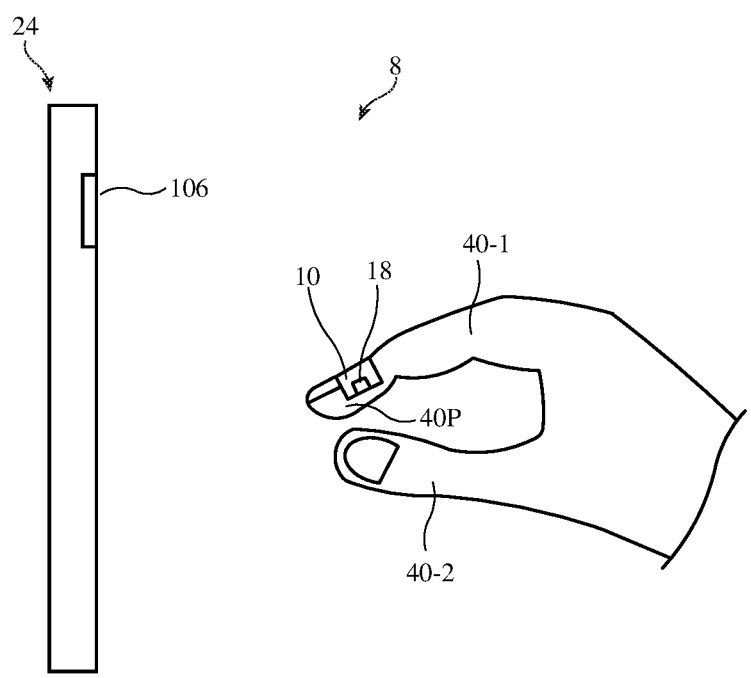
FIG. 14 is a side view of an illustrative system for calibrating a finger device based on captured images from a camera in accordance with an embodiment.

Instead of or in addition to calibrating sensors 18 in device 10 with a force sensor, device 10 may be calibrated with a camera. This type of arrangement is illustrated in FIG. 14. As shown in FIG. 14, device 24 may include one or more digital image sensors such as camera 106. Camera 106 may be a front-facing camera in a head-mounted device, a front or rear-facing camera in a portable electronic device such as cellular telephone, tablet, laptop, etc., and/or other suitable camera.

During calibration operations, camera 96 may be configured to capture images of the user's finger 40 while sensors 18 gather displacement data as pressure is applied to finger pulp 40P of finger 40. Pressure may be applied on finger pulp 40P of finger 40-1 with another finger such as thumb 40-2 and/or may be applied with an external surface that finger 40-1 is contacting. Control circuitry 12 and/or control circuitry 26 may analyze the captured images to determine how the user's finger 40 moves as pressure is applied to pulp 40P. This may include, for example, determining an amount of deformation of the exposed portions of finger 40 and/or determining an offset between the thumb and finger as the thumb presses on finger pulp 40P and/or moves finger pulp 40P from left to right, from side to side, etc. These calibration measurements may be used to produce calibration data that maps displacement values measured by sensors 18 to corresponding finger deformation values and/or finger offset values. The calibration data may be stored in device 10 and/or device 24. Calibration operations may take place during normal operation of devices 10 and 24 and/or may take place during a dedicated calibration procedure.

During normal use of device 10, control circuitry 12 and/or control circuitry 26 may use the stored calibration data to map the displacement measurements from sensors 18 to the appropriate finger deformation values and/or finger offset values.

Figure 15:
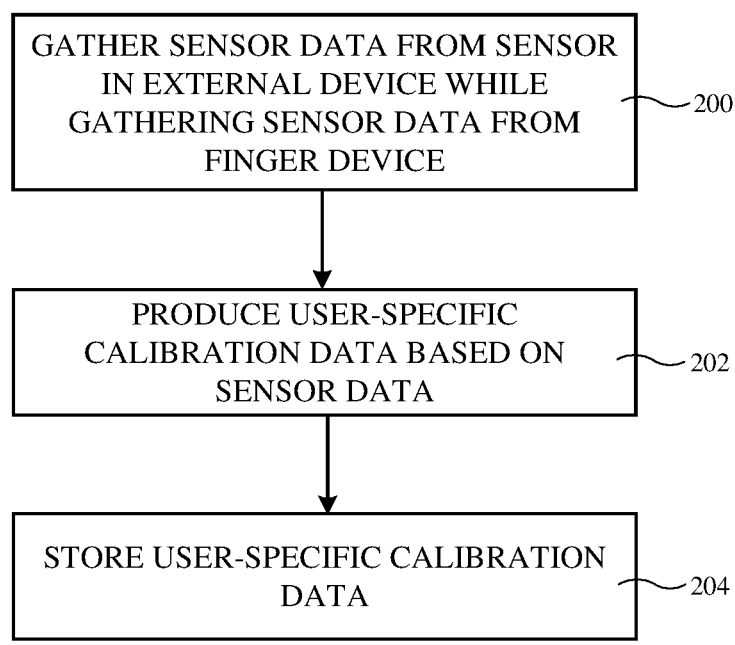
FIG. 15 is a flow chart of illustrative steps involved in calibrating a finger device using an external electronic device in accordance with an embodiment.

FIG. 15 is a flow chart of illustrative steps involved in calibrating sensors 18 in device 10 using an external device such as device 24. The calibration operations of FIG. 15 may take place during regular operation of devices 10 and 24 and/or may take place during a dedicated calibration procedure. If desired, the calibration process of FIG. 15 may be conducted for multiple different fingers to account for skin compliance variations in the user's fingers.

During the operations of block 200, control circuitry 12 and/or control circuitry 26 may gather sensor data from a sensor in external device 24 while gathering sensor data from sensors 18 in device 10. The sensor data from external electronic device 24 may be force sensor data from a force sensor (e.g., force sensor 66) that is contacted by the user's finger 40 wearing device 20 and/or may be image sensor data from a camera (e.g., camera 96) that captures images of the user's finger 40 wearing device 10. The sensor data from sensors 18 may be displacement sensor data corresponding to the displacement of the side portions of the user's finger 40 as the finger is compressed by another finger, an external surface, or other structure.

For example, the user may press finger 40 wearing device 10 against a surface containing force sensor 66. Sensors 18 may measure displacement of the side portions of finger 40 (e.g., changes in distance D of FIG. 4) and force sensor 66 may measure applied force against force sensor 66 as finger 40 contacts force sensor 66. The force sensor may be part of an input device, may be a force sensor dedicated to calibration of device 10, and/or may be a force sensor that gathers force measurements when finger 40 happens to contact sensor 66 during normal operation of device 24.

As another example, the user may press finger 40 wearing device 10 against an external surface (e.g., surface 48) or against another finger (e.g., finger 40-2). Camera 106 may capture images of the user's fingers while sensors 18 measure displacement of the side portions of finger 40 (e.g., changes in distance D of FIG. 4). Control circuitry 12 and/or control circuitry 26 may determine a finger-to-finger offset amount and/or a finger deformation amount based on the captured images.

During the operations of block 202, control circuitry 12 and/or control circuitry 26 may produce user-specific (and finger-specific) calibration data based on the calibration measurements gathered during the operations of block 200. This may include, for example, determining a user-specific mapping algorithm for mapping displacement values to force values based on the calibration measurements and/or determining a user-specific algorithm for mapping the displacement values to finger-to-finger offset amounts and/or a finger deformation amounts.

During the operations of block 204, control circuitry 12 and/or control circuitry 26 may be used to store the calibration data determined during the operations of block 202.

During subsequent use of device 10, control circuitry 12 and/or control circuitry 26 may use the stored calibration data to process sensor data from sensors 18 to thereby account for variations in skin compliance. For example, control circuitry 12 and/or control circuitry 26 may use the stored calibration data to map displacement values from sensors 18 to force values, finger-to-finger offset amounts, and/or finger deformation amounts.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

TABLE of Reference Numerals

| | |
|---|---|
| 8 | System |
| 10 | Finger device |
| 12 | Control circuitry |
| 14 | Communications circuitry |
| 16 | Input-output devices |
| 18 | Sensors |
| 20 | Haptic output devices |
| 22 | Other devices |
| 24 | Electronic device |
| 26 | Control circuitry |
| 28 | Communications circuitry |
| 30 | Input-output devices |
| 32 | Sensors |
| 34 | Haptic output devices |
| 36 | Other devices |
| 38 | Wireless link |
| 40, 40-1, 40-2 | Finger |
| 40P | Finger pulp |
| 42 | Fingernail |
| 44 | Housing |
| 46 | Locations |
| 48 | Surface |
| 50 | Structure |
| 52, 54 | Directions |
| 58, 60, 62 | Curves |
| 64 | Display |
| 66 | Force sensor |
| 68 | Support structures |
| 70 | Housing |
| 72 | Display |
| 74 | Housing |
| 76 | Port |
| 78 | Display |
| 80, 104 | Upper and lower housing |
| 82 | Membrane |
| 84 | Rotational axis |
| 86 | Trackpad |
| 88, 90 | Housing portions |
| 92 | Direction |

TABLE-continued of Reference Numerals

| | |
|---|---|
| 94 | Light |
| 96 | Ear portion |
| 98 | Stalk portion |
| 102 | Hinge |
| 106 | Camera |
| 116 | Cavity |
| 200, 202, 204 | Blocks in flow chart |

What is claimed is:

1. A system, comprising:
an electronic device having a force sensor;
a finger device configured to be worn on a finger and having a displacement sensor that measures displacement of a side portion of the finger, wherein the force sensor gathers force measurements and the displacement sensor gathers displacement measurements while the finger contacts the force sensor; and
control circuitry that stores calibration data based on the force measurements and the displacement measurements.

2. The system defined in claim 1 wherein the electronic device comprises a touch-sensitive display and the force sensor gathers the force measurements while the finger contacts the touch-sensitive display.

3. The system defined in claim 2 wherein the electronic device is selected from the group consisting of: a watch, a cellular telephone, and a tablet computer.

4. The system defined in claim 1 wherein the electronic device comprises head-mounted support structures and a display that is supported by the head-mounted support structures, wherein the force sensor is located in the head-mounted support structures.

5. The system defined in claim 4 wherein the force sensor forms part of a button in the head-mounted support structures.

6. The system defined in claim 1 wherein the electronic device comprises a storage case configured to store the finger device.

7. The system defined in claim 6 wherein the force sensor is located on an exterior surface of the storage case.

8. The system defined in claim 1 wherein the displacement sensor comprises an optical displacement sensor.

9. The system defined in claim 8 wherein the optical displacement sensor comprises a self-mixing interferometric optical displacement sensor.

10. The system defined in claim 1 wherein the finger device comprises a flexible membrane that rests against the side portion of the finger, wherein the displacement sensor is separated from the flexible membrane by a gap, and wherein the displacement sensor gathers the displacement measurements by measuring a change in a size of the gap between the flexible membrane and the displacement sensor.

11. The system defined in claim 1 wherein the external electronic device comprises an earbud and wherein the force sensor is located in the earbud.

12. A finger device configured to be worn on a finger to control an electronic device with a display, the finger device comprising:
an upper housing portion configured to extend across a top of the finger;
first and second side housing portions configured to extend down respective first and second opposing sides of the finger while leaving a finger pad of the finger exposed;

a proximity sensor in the first side housing portion that measures a change in a distance between the proximity sensor and the first side of the finger as the finger pad contacts an external surface; and control circuitry that stores calibration data that maps the change in the distance to a force value.

13. The finger device defined in claim 12 wherein the calibration data compensates for variations in skin compliance.

14. The finger device defined in claim 12 wherein the proximity sensor comprises a self-mixing interferometric optical proximity sensor.

15. The finger device defined in claim 12 wherein the proximity sensor comprises a capacitive proximity sensor.

16. The finger device defined in claim 12 wherein the finger device comprises a flexible membrane that rests against the first side of the finger and that moves toward the proximity sensor when the finger is compressed against the external surface.

17. The finger device defined in claim 12 wherein the calibration data is based on calibration measurements gathered by a force sensor in the electronic device.

18. A system, comprising:

an electronic device having a camera;

a finger device configured to be worn on a finger and having a sensor that measures movements of a side portion of the finger, wherein the camera captures images of the finger while the finger contacts a surface and the sensor gathers sensor measurements while the finger contacts the surface; and control circuitry that stores calibration data based on the captured images and the sensor measurements.

19. The system defined in claim 18 wherein the sensor comprises an optical proximity sensor.

20. The system defined in claim 18 wherein the electronic device comprises a head-mounted display.

* * * * *